Figure 1:
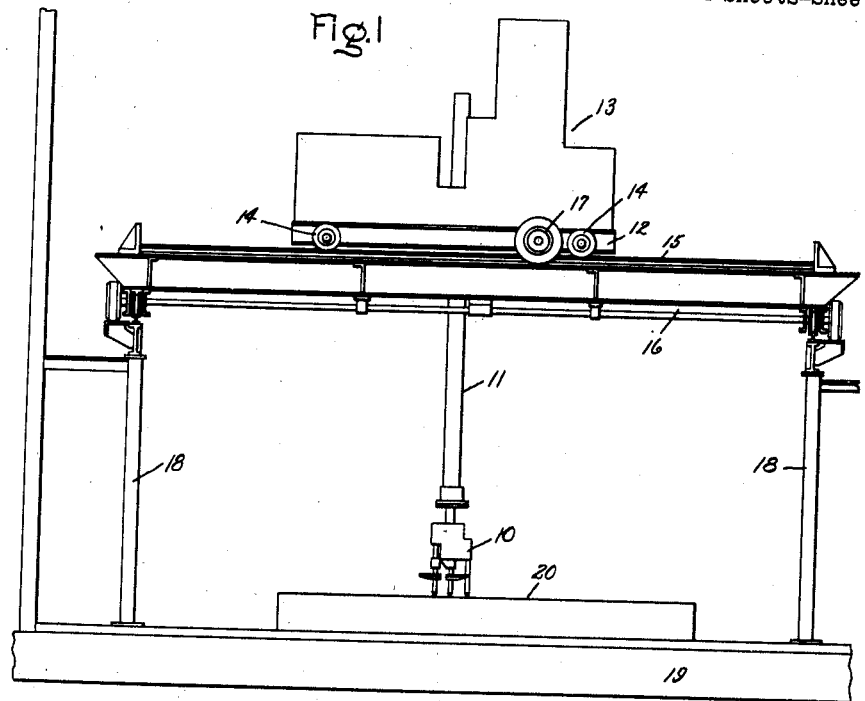

Dec. 2, 1941.  C. P. BLOOMER ET AL  2,264,825
RESISTANCE WELDING MACHINE
Filed July 19, 1940  4 Sheets-Sheet 1

Inventors:
Charles P. Bloomer,
Albert D. Canner.
By Harry E. Dunham
Their Attorney.

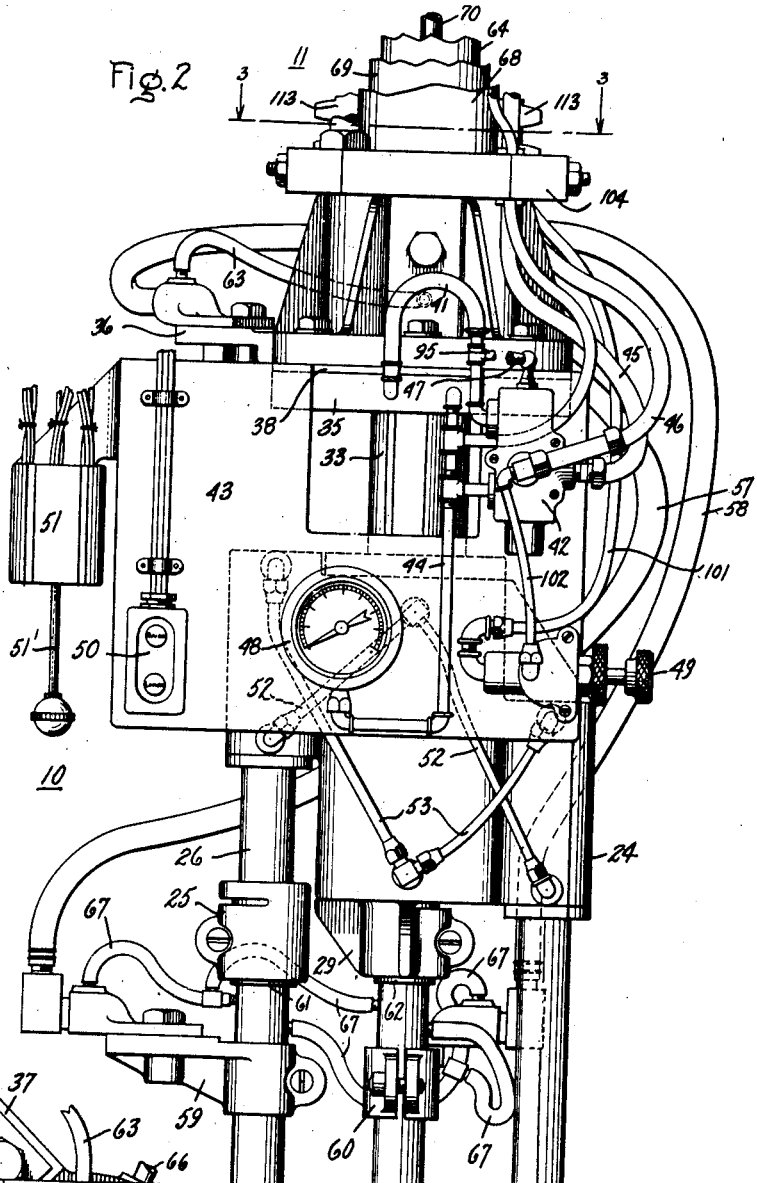
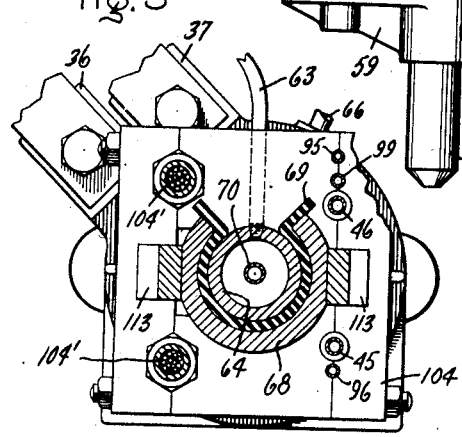

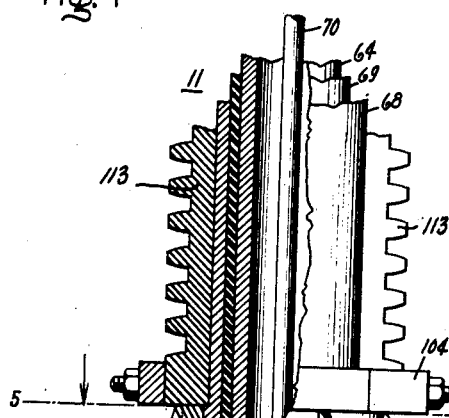
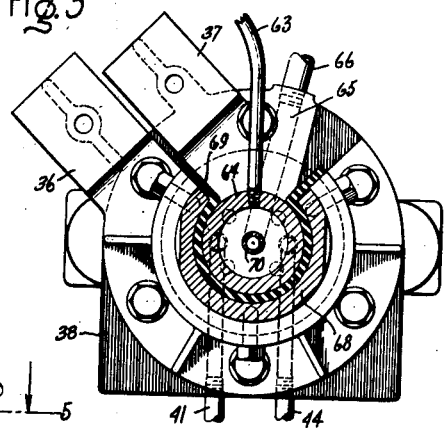
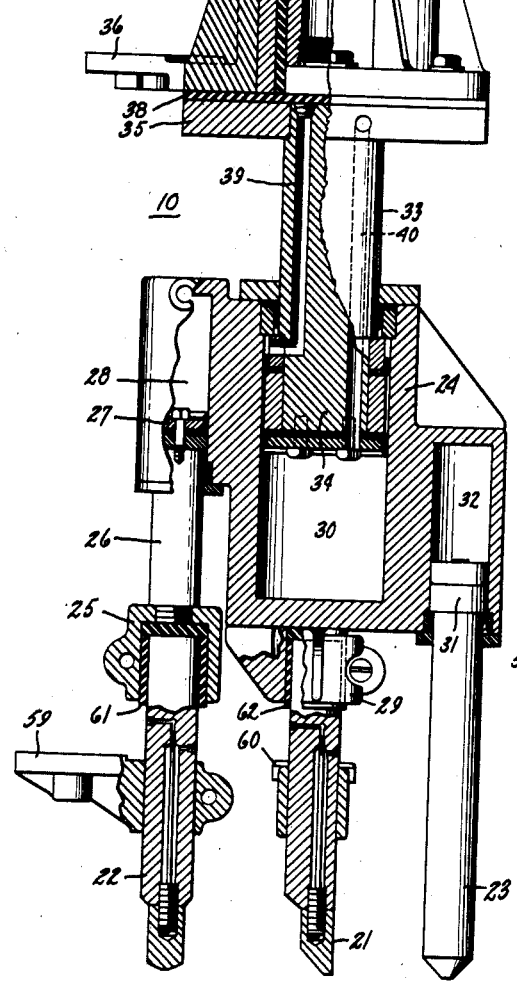
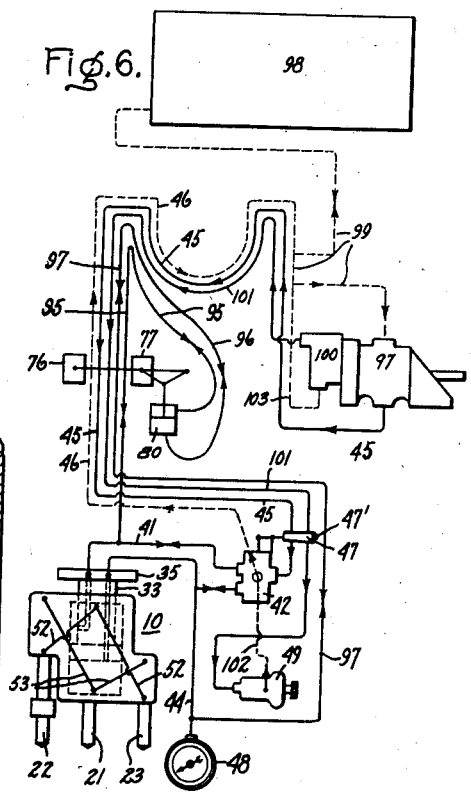

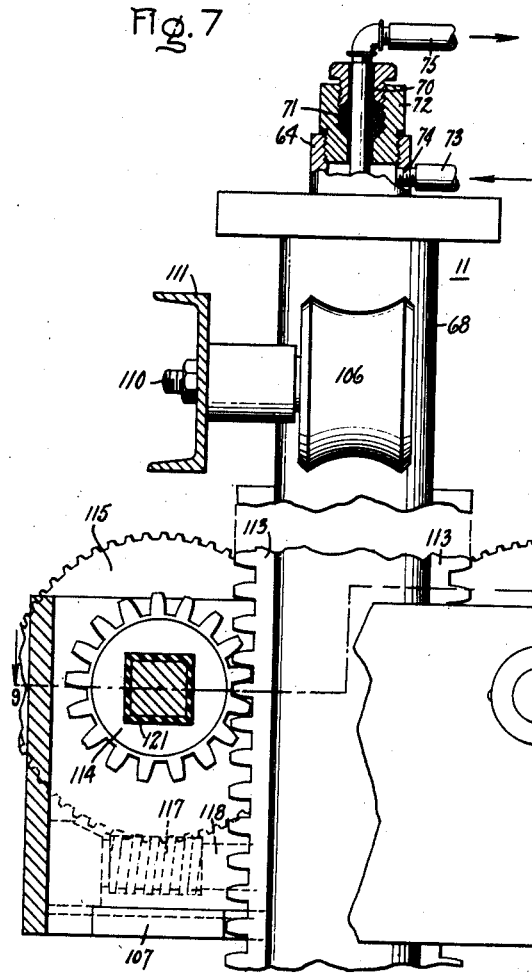
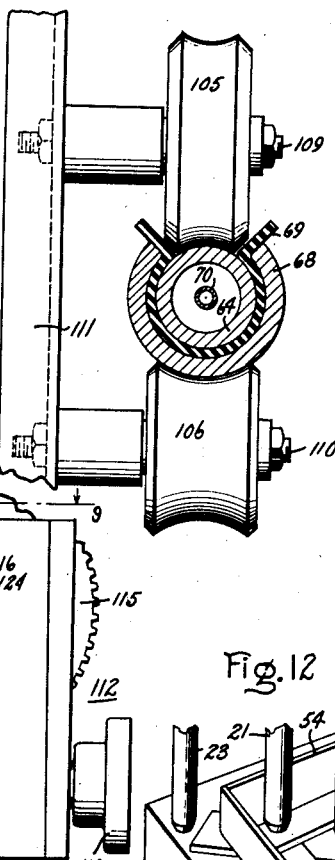
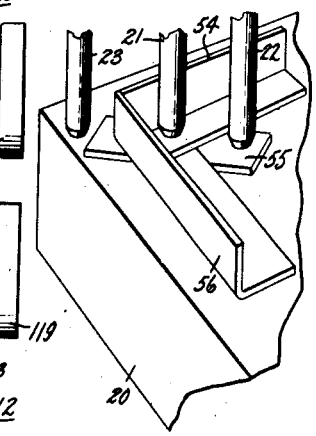
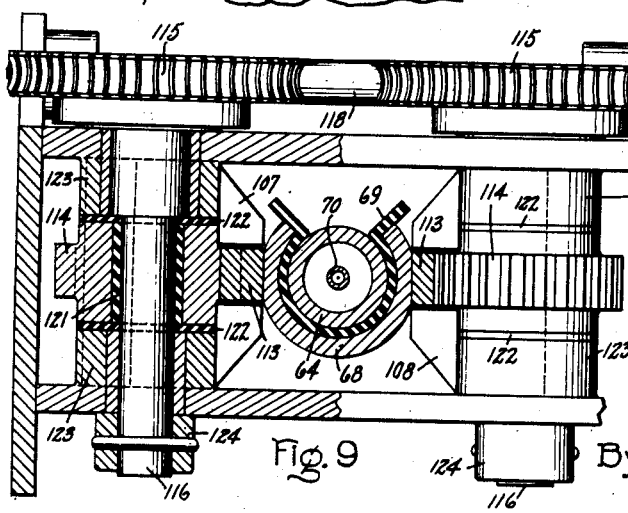

Patented Dec. 2, 1941

2,264,825

UNITED STATES PATENT OFFICE 2,264,825

RESISTANCE WELDING MACHINE

Charles P. Bloomer, Ridley Park, and Albert D. Canner, Upper Darby, Pa., assignors to General Electric Company, a corporation of New York Application July 19, 1940, Serial No. 346,396

12 Claims. (Cl. 219—4)

Our invention relates to resistance welding machines which are movable over a supporting surface to a plurality of welding positions on a structure which has been assembled on this supporting surface.

Machines embodying our invention are particularly suited for welding assemblies in which at each point of welding a bar of copper or the like is inserted between the lower joint member and its support at the point of welding and the electrodes of the welding machine are respectively brought into engagement with the projecting end portion of this copper bar and the outside surface of the upper joint member at the point of welding. Such assemblies facilitate the making of projection welds between heavy members having limited areas of contact with one another at the point of welding.

It is an object of our invention to provide a resistance welding machine in which the electrodes are supported on a welding ram of improved construction.

It is a further object of our invention to provide a welding machine in which the ram is formed of electrically conductive material and in which means are provided for lengthwise movement of the ram relative to its support which is provided with an electrically conductive clamp whose jaws are movable into and out of engagement with the ram.

It is a further object of our invention to provide means at the end of the ram for moving electrodes into and out of a welding position and for exerting pressure thereon when in a welding position which means is interlocked with means for operating the current conductive clamp so that the clamp is forced into conductive engagement with the ram when the electrodes are moved to their welding position and pressure is applied to them.

It is also an object of our invention to provide a welding head in which greater pressure is applied to a main electrode which makes the weld then to an auxiliary electrode which completes the welding circuit and in which the main electrode is aligned with the ram on which said head is supported and the turning movement on the ram exerted by the pressure applied to the auxiliary electrode which is offset from the longitudinal axis of the ram is counter-balanced by the pressure applied to an equalizer forming part of the welding head.

Further objects of our invention will become apparent from a consideration of the following description of the welding machine illustrated in the attached drawings.

Figure 10:
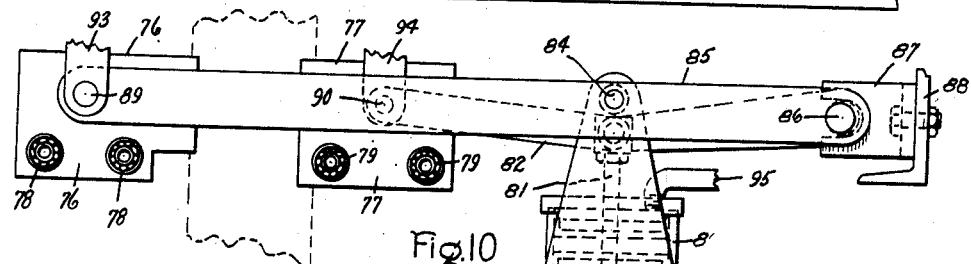
Figure 11:
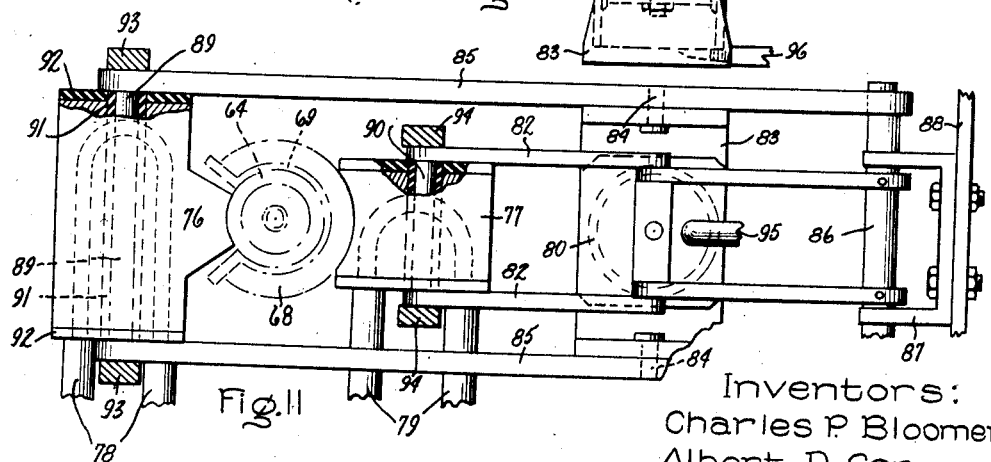

Fig. 1 of these drawings is a side view of a welding machine embodying our invention; Fig. 2 is a front view of the welding head forming a part thereof; Fig. 3 is a sectional view taken along the lines 3—3 of Fig. 2 to illustrate the concentric tube construction of the welding ram; Fig. 4 is a view partly in section of the welding head and the lower portion of the ram to which it is attached; Fig. 5 is a sectional view taken along lines 5—5 of Fig. 4; Fig. 6 is a piping diagram illustrating the fluid pressure control system of the machine; Fig. 7 is a side view partly in section illustrating the feeding mechanism for the ram; Fig. 8 is a plan view of the top portion of the structure shown in Fig. 7; Fig. 9 is a view taken along lines 9—9 of Fig. 7; Figs. 10 and 11 are side and plan views of the mechanism for operating the clamp contacts by means of which welding current is supplied to the ram; and Fig. 12 is a perspective view illustrating the manner in which the electrodes and equalizer of the welding head may be used in performing a projection spot welding operation.

The machine illustrated in the drawings consists of a bridge having power driven lateral movement on suitably elevated tracks, a carriage having power driven longitudinal movement on tracks carried on the movable bridge and a welding ram having power driven vertical movement relative to the carriage. The complete equipment necessary for performing the desired resistance welding operations is mounted on the carriage of the machine. This equipment comprises a welding transformer, tube circuit control for timing the application of welding current, tanks for oil and cooling water, a radiator and fan for cooling the water, motors and pumps for circulating the cooling water and supplying oil under pressure, electric switches forming part of the control and the various motor controls required for operating the bridge, carriage and ram. The control switches for these latter motors are conveniently mounted on the welding head which is supported on the lower end of the welding ram. This ram consists of two electrically conductive tubes assembled one within the other and electrically insulated from one another. The welding head is mounted at the lower end of the ram and embodies fluid operated means for applying a controlled pressure to the welding electrodes and an equalizer forming part of the welding head. Welding current is supplied to these electrodes through flexible conductors connected to the tubes of the ram at that end where the welding head is mounted thereon. Current is supplied to these tubes through contacts mounted on the carriage in which the ram is supported. These contacts are moved into and out of conductive engagement with the tubes of the ram by means of a fluid operated clamping mechanism which is interlocked with the fluid operated pressure mechanism in the welding head so that when the electrodes and equalizer of the welding head are moved to a welding position and welding pressure is applied thereto, the contacts for supplying welding current to the tubes of the ram are forced into positive conductive engagement therewith.

As shown in Fig. 1 of the drawings, the welding head 10 is mounted on the lower end of a ram 11 which is supported for vertical movement on a carriage 12. This carriage supports the complete equipment necessary for performing the desired welding operations. This equipment will not be particularly described and consequently has been indicated in outline at 13. Carriage 12 is provided with wheels 14 which engage and travel along a track 15 mounted on a bridge 16. It is propelled along this track by rubber-tired wheels 17 which engage runways on bridge 16. This bridge in turn is supported for movement along craneways 18 which are mounted on a suitable support 19 which may be the floor of a building. Upon support 19 there is an assembly table 20 upon which the work is assembled and welded. Electric brakes (not shown) may be associated with the travel motors of carriage 12 and bridge 16 to hold the carriage and bridge in the positions to which they have been moved by their travel motors.

As shown in Figs. 2 and 4, the welding head is provided with a main electrode 21, an auxiliary electrode 22 and an equalizer 23. These electrodes and equalizer are moved to and from a welding position by means of pistons located in a cylinder block 24. Auxiliary electrode 22 is clamped and held in an adapter 25 which is attached to one end of a piston rod 26 whose other end is provided with a piston 27 located in a cylinder 28 forming part of block 24. Main electrode 21 is clamped and held in an adapter 29 which is attached to the cylinder head of main cylinder 30 also forming part of block 24. Equalizer 23 in turn is provided with a piston 31 enclosed within a cylinder 32 also forming part of block 24. It will be noted that the several cylinders are parallel to one another.

Cylinder block 24 is supported on the lower end of welding ram 11 by means of a piston rod 33, the lower end of which is connected to a piston 34 enclosed within cylinder 30 and the upper end of which is attached to a plate 35 which is bolted to but electrically insulated from the tube terminals 36 and 37 of ram 11 by a sheet of insulating material 38.

Oil is supplied to the opposite sides of piston 34 through passageways 39 and 40 which extend through piston rod 33 and plate 35 to an edge portion thereof where passageway 39 is connected by a hose 41 to a control valve 42 mounted on a control board 43 attached to the welding head and passageway 40 is connected by a pipe 44 to this same valve. Oil pressure is supplied to valve 42 through a pipe 45 and is exhausted therefrom through a pipe 46. Control valve 42 is provided with a handle 47 which when moved to one position supplies oil under pressure through hose 41 and passageway 39 to the upper end of piston 34 and exhausts oil from the lower end of piston 34 through passageway 40 and pipe 44 and which when moved to another position, supplies oil under pressure through pipe 44 and passageway 40 to the lower end of piston 34 and establishes an exhaust connection from the upper end of piston 34 through passageway 39 and hose 41 to valve 42. This latter position of the valve handle causes cylinder block 24 to move main electrode 21 to its welding position in which it engages the work and applies a predetermined pressure thereto. The amount of this pressure may be indicated on an oil gage 48 which is connected to pipe 44. This gage is also supported on control board 43 as is a pilot valve 49 which controls the oil pressure supplied to valve 42 through pipe 45, a switch 50 for controlling the raising and lowering of ram 11, and a switch 51 for controlling the bridge and carriage motors for positioning ram 11 over a desired point of welding. Switch 51 and the control of which it forms a part, is fundamentally the same as shown in Fig. 8 of United States Letters Patent 2,030,689, James A. Dorrat, granted February 11, 1936, and assigned to the assignee of this invention.

As shown in Fig. 2, the upper and lower portions of cylinder 30 are respectively connected to the lower and upper portions of cylinders 28 and 32 by pipes 52 and 53. Consequently, when oil under pressure is supplied to the upper portion of cylinder 30, oil under pressure is simultaneously applied to the lower portions of cylinders 28 and 32 which causes auxiliary electrode 22 and equalizer 23 to be withdrawn from their welding position at the same time main electrode 21 is withdrawn from its welding position by the relative movement of cylinder 30 and piston 34. On the other hand, when oil under pressure is supplied to the lower portion of cylinder 30 thereby moving cylinder block 24 toward the work, at the same time oil under pressure is supplied to the upper portions of cylinders 28 and 32 moving auxiliary electrode 22 and equalizer 23 into their welding position at the same time main electrode 21 is moved to its welding position. The relative and independent movements of the electrodes and equalizer thus provided, insures that they adapt themselves to irregularities of the work and its support.

It will be noted that by reason of the relative sizes of the piston and cylinders greater pressure is applied to main electrode 21 than is applied to auxiliary electrode 22 and equalizer 23. It will also be noted that main electrode 21 is in alignment with the longitudinal axis of ram 11 and that auxiliary electrode 22 and equalizer 23 are offset from the longitudinal axis of this ram. Unless equalizer 23 is provided, the pressure applied to auxiliary electrode 21 would exert a turning moment on ram 11. It is the purpose of equalizer 23 to neutralize the turning moment of auxiliary electrode 22 by opposing an equal and opposite turning moment to ram 11.

When performing projection spot welding operations for which the welding head illustrated is particularly suited, as shown in Fig. 12, main electrode 21 engages the outside surface of an upper joint member 54 at the point of welding and auxiliary electrode 22 engages the projecting end portion of a copper bar 55 which is inserted between the lower joint member 56 and its support 20 at the point of welding opposite main electrode 21. Equalizer 23 engages the support 20 for the joint members and counteracts the turning moment of auxiliary electrode 22. Welding pressure is exerted by main electrode 21 and the pressure exerted by auxiliary electrode 22 is only sufficient to complete the welding circuit through bar 55 to joint member 56 which rests thereon.

As shown in Figs. 2 and 3, flexible electric conductors 57 and 58 connect tube terminals 36 and 37 of ram 11 with terminals 59 and 60 of electrodes 22 and 21. These electrodes, as shown in Fig. 4, are electrically insulated from their adapters 25 and 26 by insulation 61 and 62.

Cooling fluid, for example water, is supplied through a passageway 63 in conductor tube 64 of ram 11 and a passageway 65 (Fig. 5) in its terminal 37 by means of hoses 66 to the ram terminals of flexible conductors 57 and 58 which are hollow and conduct this cooling fluid to their electrode terminals which are connected to terminals 59 and 60 of the welding electrodes. From these terminals the cooling fluid is supplied to the cooling passages in the electrodes through hose sections 67 shown in Fig. 2 of the drawings.

As best shown in Figs. 2 to 5 inclusive of the drawings ram 11 is formed of inner and outer sections of current conducting material such as copper tubes 64 and 68. These tubes are separated from one another by insulation 69 and the outer tube 68 has a longitudinal portion cut away to expose a corresponding longitudinal portion of the inner tube 64. Passageways for cooling fluid are provided within conductor tube 64 by a pipe 70 which extends through its central portion. One end of this pipe is connected with passageway 65 in terminal 37 of tube 64 and its other end extends through a packing gland 71 (Fig. 7) in a plug 72 which closes the upper end of tube 64. Cooling fluid is supplied through a hose 73 and passageway 74 in the top side wall of tube 64, through the passageway defined between the inner wall of this tube and the outer wall of pipe 70, thence through passageway 63 in the lower end wall of conductor tube 64 to the electrodes from which it is exhausted through passageway 65 in terminal 37 of tube 64 and pipe 70 to hose 75.

As shown in Figs. 10 and 11, welding current is supplied to the conductor tubes of ram 11 through contact blocks 76 and 77 forming part of a clamping mechanism. Contact block 76 is adapted to extend through the cut away portion of the outer conductor tube 68 into engagement with the inner conductor tube 64 and contact block 77 is adapted to engage conductor tube 68. Welding current is supplied to these contact blocks through conductors 78 and 79 from a welding transformer mounted on carriage 12. These conductors are hollow and cooling fluid is passed through them and through passageways in the contact blocks for cooling the conductors and the contact blocks.

Contact blocks 76 and 77 are supported from the frame of travel carriage 12 by a clamping linkage which embodies a double acting piston and cylinder 80 connected by a psiotn rod 81 to a toggle 82 forming part of the linkage. Cylinder 80 is supported on a saddle 83 which is mounted by pivot pins 84 on links 85. The right hand ends of these links are supported for rotation about the crank shaped ends of a pin 86 which is located in open ended slots in the flanges of a channel member 87 which is attached to a frame member 88 of the travel carriage 12. The right hand ends of toggle 82 are also supported on and attached to the central portion of pin 86 which is located between the flanges of channel member 87. Contact blocks 76 and 77 are rotatably mounted on pins 89 and 90 which connect the left hand ends of links 85 and the left hand end of toggle 82. Bushings 91 and washers 92 electrically insulate these blocks from pins 89 and 90, links 85, and the links of toggle 82. The ends of pins 89 and 90 are supported by pairs of links 93 and 94 which are pivoted from the frame of travel carriage 12. It will thus be seen that when the toggle 82 is closed by the piston and cylinder 80, it forces contact block 77 into clamping engagement with conductor tube 68 of ram 11 and at the same time turns pin 86 which through its crank shaped ends move links 85 to the right and force conductor block 76 into clamping engagement with conductor tube 64 of ram 11. The supporting of cylinder 80 on pivoted saddle 83 permits relative movement between links 85 and toggle 82.

Oil is supplied to and exhausted from opposite ends of cylinder 80 through oil lines 95 and 96. As shown in the diagram of Fig. 6, oil line 95 connects with pipe 41 on the welding head and oil line 96 connects with pipe 44 also on the welding head. Control valve 42 on the welding head, consequently simultaneously controls the supply of oil to cylinder 80 as well as to the cylinders in the welding head 10. The arrangement is such that contact blocks 76 and 77 are placed in clamping engagement with the conductor tubes of ram 11 when electrodes 21 and 22 and equalizer 23 are moved to a welding position and pressure is applied thereto. On the other hand, when the electrodes 21 and 22 and equalizer 23 are moved from their welding position under the control of valve 42, contact blocks 76 and 77 are moved out of clamping engagement with the conductor tubes of ram 11.

As shown in Fig. 6, oil under pressure is supplied to control valve 42 through oil line 45 from oil pump 97. Oil is supplied to this pump from a storage tank 98 through a line 99. The pressure of the oil supplied by pump 97 is controlled by a relief valve 100 associated therewith. This relief valve is set by pilot valve 49 mounted on the welding head. A pressure line 101 connects relief valve 100 with pilot valve 49 and an exhaust line 102 connects pilot valve 49 with the exhaust line 46 of valve 42. This exhaust line is connected through line 99 with both the oil tank 98 and pump 97. An exhaust line 103 also connects relief valve 100 with line 99 and oil tank 98. The adjustment of pilot valve 49 controls relief valve 100 which in turn controls the pressure of the oil supplied by pump 97. This pump, the motor for driving it, and oil tank 98 are mounted on travel carriage 12 of the welding machine. The pressure and exhaust lines 45, 46, 95, 97 and 101 extend along and are mounted on ram 11 by clamps 104 shown in Figs. 2, 3 and 7. In order to accommodate the relative movement of ram 11 and carriage 12 and the relative movement of ram 11 and head 10, certain portions of the oil pressure and exhaust lines above described are made flexible as indicated by the looped portions in Figs. 2 and 6.

Control handle 47 of valve 42 has in its end a switch 47' for controlling the flow of welding current. The conductors connecting this switch as well as switches 50 and 51 with the control equipment on carriage 12 pass through pipes 104' which are also mounted on ram 11 by clamps 104.

As shown in Figs. 7, 8 and 9, ram 11 is supported and guided in carriage 12 of the welding machine by rolls 105 and 106 and guides 107 and 108. Rolls 105 and 106 are made of insulating material and are supported for rotation on studs 109 and 110 which are attached to a part of the superstructure 111 of carriage 12. These rolls engage respectively the inner and outer conductor tubes 64 and 68 of the ram. Guides 107 and 108 are also made of insulating material. They are attached to the frame members of carriage 12 to which the feeding mechanism 112 for ram 11 is also attached. Slots in these guides engage the side surfaces of racks 113 attached to flattened longitudinal surfaces of conductor tube 68 of the ram.

The feeding mechanism for ram 11 comprises spur gears 114, which engage racks 113, and means for driving these gears. As shown in Figs. 7 and 9, this driving means comprises worm wheels 115 attached to the ends of shafts 116 on which spur gears 114 are mounted, worms 117 and a shaft 118 connecting these worms to a coupling 119 which is connected to and driven by the coupling on the output shaft of a motor driven speed reducer. Gears 114, shaft 116, worm wheels 115, worm 117, and their driving shaft are all supported by a frame 120 which is bolted to the frame of carriage 12 of the welding machine.

Spur gears 114 are mounted on squared portions of shafts 116 and insulated therefrom by bushings 121. Washers 122 are also provided to insulate these gears from frame 120. The end portions of shafts 116 are rotatably mounted in bearings 123 forming part of frame 120. Worm wheels 115 are attached to the ends of these shafts which project on one side of frame 120 and collars 124 are pinned to the ends of these shafts which project from the other side of frame 120.

In view of the above description of our welding machine its operation is believed to be apparent. Briefly, it is as follows: The operator positions the welding head over the point of welding by moving the control handle 51' of switch 51 in the direction in which he desires to move the welding head. This switch controls the operation of the travel motors associated with carriage 12 and bridge 16 to move them along their supporting tracks and produces a resultant movement of ram 11 and head 10 in the direction in which control handle 51' of switch 51 has been moved. The main electrode 21 of the head should be positioned over the work assembly as shown in Fig. 12 and by swiveling the welding head about piston rod 33, auxiliary electrode 22 and equalizer 23 may be brought into the positions also shown in Fig. 12. When the head 10 has been thus positioned, switch 50 is operated to move ram 11 toward the work so that head 10 is positioned relative thereto within the range of travel of electrodes 21 and 22 and equalizer 23. Valve 42 is then operated to bring the electrodes and equalizer to their welding position and exert pressure thereon and at the same time to force contact blocks 76 and 77 of the ram clamp into firm engagement with the conductor tubes 64 and 67 thereof. The operator then depresses switch 47' in handle of valve 42, and this initiates a timed application of welding current. After the welding operation has been concluded, valve 42 is operated to release contact blocks 76 and 77 and raise electrodes 21 and 22 and equalizer 23 from their welding position. In order to clear the work, it may also be necessary to raise ram 11 which may be done by operating switch 50. The welding head may then be positioned with main electrode 21 over the next point of welding by operating control switch 51.

It will be understood that various modifications of our invention are possible without departing therefrom. For example, instead of supporting the welding head and ram for movement in all directions in a horizontal plane, it may be supported for movement in all directions in any other plane. Furthermore, the particular arrangement of welding electrodes and equalizer which adapt our machine for performing projection welding operations when the work has been assembled in a predetermined manner, may be modified in order to render our machine capable of performing other kinds of welding on other assemblies. We intend, consequently, to cover by the appended claims all those modifications and variations which fall within the true spirit and scope of our invention.

What we claim as new and desire to secure by Letters Patent of the United States, is:

1. Resistance welding apparatus comprising a ram having a plurality of longitudinal current conducting sections positioned side by side and electrically insulated from one another, means for supplying welding current to said sections of said ram, a plurality of electrodes, means mounted on one end of said ram for moving said electrodes relatively to said ram, and means for electrically connecting one of said electrodes to each of said sections at the end of said ram to which said last mentioned means is attached.

2. Resistance welding apparatus comprising a ram having a plurality of longitudinal current conducting sections positioned side by side and electrically insulated from one another, means for supplying welding current to said sections of said ram, a plurality of electrodes electrically insulated from one another, fluid operated means mounted on and electrically insulated from one end of said ram for moving said electrodes relatively to said ram, and means including flexible conductors for electrically connecting one of said electrodes to each of said sections at the end of said ram to which said fluid operated means is attached.

3. Resistance welding apparatus comprising a welding electrode, an electrically conductive ram for supplying welding current to said electrode, fluid operated means mounted on one end of said ram and electrically insulated therefrom for applying welding pressure to said electrode, means including a flexible conductor for supplying welding current to said electrode from the end of said ram on which said fluid operated means is mounted, a support, means for feeding said ram relative to said support, means for electrically insulating said ram from said support and from said feeding means, and means for supplying welding current to said ram.

4. Resistance welding apparatus comprising a ram having inner and outer longitudinal sections of current conducting material electrically insulated from one another, the outer section of said ram being cut away to expose a longitudinal portion of the inner section thereof, an electrode electrically connected with each of said sections of said ram and mounted on the end portion of said ram, a support for said ram, means for lengthwise feeding said ram relatively to said support, means for electrically insulating said ram from said support and said feeding means, means including a plurality of contacts mounted on and electrically insulated from said support for supplying welding current to each section of said ram, and means for moving said contacts into and out of engagement with the sections of said ram.

5. A resistance welding machine comprising an electrically conductive ram, a welding electrode, fluid operating means mounted on one end of said ram and electrically insulated therefrom for moving said electrode relative to said ram into engagement with the work, means including a flexible conductor for electrically connecting said electrode to the end of said ram on which said fluid operated means is mounted, a support, means for lengthwise feeding said ram relatively to said support, means for insulating said ram from said support and from said feeding means, means including a fluid operated clamp mounted on and electrically insulated from said support for engaging and supplying welding current to said ram, and means for simultaneously applying fluid pressure to said clamp and to said electrode moving means.

6. Resistance welding apparatus comprising a current conducting ram, a carriage supported for movement in all directions in a plane, means for feeding said ram relative to said carriage toward and away from the work, means including a clamp mounted on said carriage and adapted when closing to engage and supply welding current to said ram, means for supplying welding current to said clamp, means for insulating said ram, said feeding means and the current conducting portions of said clamp from said carriage, a resistance welding electrode, means mounted on one end of said ram for applying welding pressure to said electrode, means for electrically connecting said electrode to the end of said ram on which said last mentioned means is mounted, and means for simultaneously closing said clamp and operating said means for supplying welding pressure to said electrode.

7. Resistance welding apparatus comprising a current conducting ram, a carriage supported for movement in all directions in a plane, means for feeding said ram relative to said carriage toward and away from the work to be welded, means including a clamp mounted on said carriage and adapted when closing to engage and supply welding current to said ram, means for supplying welding current to said clamp, means for insulating said ram, said feeding means and the current conducting portions of said clamp from said carriage, a resistance welding electrode, means mounted on one end of said ram for applying welding pressure to said electrode, means for electrically connecting said electrode to the end of said ram on which said last mentioned means is mounted, and means including passageways extending lengthwise of said ram and series connected with passageways in said electrode for circulating a cooling medium through said ram and said electrode.

8. Resistance welding apparatus comprising a ram formed of two longitudinally disposed concentric current conducting tubes electrically insulated from one another, a longitudinal section of the outer tube being cut away to expose a corresponding longitudinal section of the inner tube, means for supplying welding current to the exposed surfaces of the tubes of said ram, means for lengthwise moving said ram relative to said current supplying means, a plurality of electrodes, means mounted on one end of said ram for moving said electrodes relatively to said ram, means for electrically connecting one of said electrodes to each of said tubes at the end of said ram to which said last mentioned means is attached, means including a pipe located within and spaced from said inner current conducting tube of said ram for defining lengthwise passageways in said ram, and means for circulating a cooling medium through said passageways.

9. A resistance welding machine comprising a ram, a main electrode at one end of and substantially in alignment with the longitudinal axis of said ram, an auxiliary electrode and an equalizer offset from the longitudinal axis of said ram and laterally spaced from opposite sides of said main electrode, and fluid operated means mounted on the end of said ram for simultaneously and independently applying pressure to said electrodes and to said equalizer, said fluid operating means being constructed and arranged to apply a predetermined pressure to said main electrode and to apply pressures to said auxiliary electrode and to said equalizer which are productive of substantially equal and opposite moments on said ram.

10. A resistance welding machine comprising a ram, a main electrode at one end of and substantially in alignment with the longitudinal axis of said ram, an auxiliary electrode and an equalizer offset from the longitudinal axis of said ram and laterally spaced from opposite sides of said main electrode, and fluid operated means mounted on the end of said ram for simultaneously and independently advancing and retracting said electrodes and said equalizer and for applying pressures thereto, the pressures applied to said auxiliary electrode and said equalizer being such as to produce substantially equal and opposite moments on said ram.

11. Resistance welding apparatus comprising a ram having longitudinal current conducting sections electrically insulated from one another and located one within the other, the outer section of said ram having a longitudinal portion cut away to expose a corresponding longitudinal portion of the inner section thereof, a support, means for lengthwise feeding said ram relative to said support, means for electrically insulating said ram from said support and said feeding means, means including current conducting jaws mounted on said support but electrically insulated therefrom for supplying welding current to the exposed portions of each section of said ram, means including a piston and cylinder for moving said jaws into and out of clamping engagement with the sections of said ram, a main electrode at one end of and substantially in alignment with the longitudinal axis of said ram, an auxiliary electrode and an equalizer offset from the longitudinal axis of said ram and laterally spaced from opposite sides of said main electrode, means including pistons and cylinders mounted on but insulated from the end of said ram for moving said electrodes and said equalizer toward and away from a welding position and for applying pressure thereto when they are in a welding position, the pressures applied to said auxiliary electrode and said equalizer being such as to produce substantially equal and opposite moments on said ram, means for electrically insulating said electrodes from said last mentioned means, means including flexible conductors for electrically connecting said electrodes with the end sections of said ram, and means for controlling the supply of pressure fluid to all of said cylinders so that said jaws are moved into clamping engagement with the sections of said ram when said electrodes and said equalizer are moved to a welding position and pressure is applied thereto and so that said jaws are moved out of clamping engagement with said sections of said ram when said electrodes and said equalizer are moved away from said welding position.

12. Resistance welding apparatus comprising a ram having longitudinal current conducting sections electrically insulated from one another and located one within the other, the outer section of said ram having a longitudinal portion cut away to expose a corresponding longitudinal portion of the inner section thereof, a support, means for lengthwise feeding said ram relative to said support, means for electrically insulating said ram from said support and said feeding means, means including current conducting jaws mounted on said support but electrically insulated therefrom for supplying welding current to each section of said ram, means including a piston and cylinder for moving said jaws into and out of clamping engagement with the sections of said ram, a main electrode, an auxiliary electrode and an equalizer spaced from opposite sides of said main electrode, parallel main and auxiliary cylinders, main and auxiliary pistons in said cylinders, means including a piston rod extending in one direction from said main cylinder for connecting said main piston to the end of said ram and for electrically insulating it therefrom, an auxiliary piston rod and an equalizer extending in the opposite direction from said auxiliary cylinders, means for connecting said auxiliary electrode to said auxiliary piston, means for connecting said main electrode to the end of main cylinder between said auxiliary electrode and said equalizer, means for electrically insulating said electrodes from their said connecting means, means including flexible conductors for electrically connecting said electrodes with the sections of said ram, at the end to which said piston rod is attached, means interconnecting said main and auxiliary cylinders for supplying fluid pressure thereto to move said electrodes and said equalizer toward and away from a welding position and for applying pressures thereto when in a welding position, and means for controlling the supply of fluid pressure to all of said cylinders so that said jaws are moved into clamping engagement with the sections of said ram when said electrodes and said equalizer are moved to a welding position and pressure is applied thereto and so that said jaws are moved out of clamping engagement with said sections of said ram when said electrodes and said equalizer are moved away from said welding position.

CHARLES P. BLOOMER.
ALBERT D. CANNER.